US009292260B2

(12) United States Patent
White

(10) Patent No.: US 9,292,260 B2
(45) Date of Patent: Mar. 22, 2016

(54) METHOD AND SYSTEM FOR IMPLEMENTING A PATTERN VIEWER

(71) Applicant: Oracle International Corporation, Redwood Shores, CA (US)

(72) Inventor: Brent-Kaan William White, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 63 days.

(21) Appl. No.: 13/924,358

(22) Filed: Jun. 21, 2013

(65) Prior Publication Data

US 2013/0346940 A1    Dec. 26, 2013

Related U.S. Application Data

(60) Provisional application No. 61/663,127, filed on Jun. 22, 2012, provisional application No. 61/777,465, filed on Mar. 12, 2013.

(51) Int. Cl.
    *G06F 9/44*      (2006.01)

(52) U.S. Cl.
    CPC ... *G06F 8/20* (2013.01); *G06F 8/34* (2013.01)

(58) Field of Classification Search
None
See application file for complete search history.

(56) References Cited

U.S. PATENT DOCUMENTS

| | | | | |
|---|---|---|---|---|
| 7,493,578 | B1* | 2/2009 | Milne | G06F 17/5045 703/3 |
| 7,676,292 | B2* | 3/2010 | Weatherhead et al. | 700/97 |
| 7,934,191 | B2* | 4/2011 | Yassin | 717/104 |
| 2001/0001882 | A1* | 5/2001 | Hamilton et al. | 717/1 |
| 2002/0073396 | A1* | 6/2002 | Crupi et al. | 717/104 |
| 2004/0044987 | A1* | 3/2004 | Kompalli | G06F 8/20 717/100 |
| 2005/0071806 | A1* | 3/2005 | Sreedhar | 717/104 |
| 2005/0268277 | A1* | 12/2005 | Reeder et al. | 717/104 |
| 2006/0168557 | A1* | 7/2006 | Agrawal et al. | 717/104 |
| 2008/0313553 | A1* | 12/2008 | Srivastava | 715/762 |
| 2009/0006472 | A1* | 1/2009 | Bush | G06F 17/2247 |
| 2010/0211927 | A1* | 8/2010 | Cai et al. | 717/104 |
| 2010/0269089 | A1* | 10/2010 | Panicker et al. | 717/105 |
| 2011/0276908 | A1* | 11/2011 | O'Riordan | G06F 9/4443 715/763 |
| 2011/0302516 | A1* | 12/2011 | White | G06F 3/0481 715/771 |
| 2012/0123996 | A1* | 5/2012 | Krinsky | G06F 17/30905 707/602 |

OTHER PUBLICATIONS

"Oracle Fusion Applications User Experience Design Patterns: Productivity Realized", An Oracle White Paper, Sep. 2011.*

* cited by examiner

*Primary Examiner* — Daxin Wu
(74) *Attorney, Agent, or Firm* — Trellis IP Law Group, PC

(57) ABSTRACT

Disclosed is an improved approach for implementing a method, system, and computer program product for utilizing design patterns, which provides an improved approach for organizing, navigating and/or visualizing design patterns. This approach may be embodied as a mobile design pattern viewer. The current approach presents design patterns in logical groupings, allows visualization of individual patterns, and highlights relationships. This permits organization, navigation, and/or visualization of the design patterns, where a collection of patterns work together as an integrated set that enables users to understand how an individual pattern relates to other patterns.

30 Claims, 18 Drawing Sheets

List

The list pattern is the primary method of presenting multiple records of enterprise data. The design of each row should only include key data that will help the user decide whether to drill into a list item or not

Related Patterns

| Name | Description |
|---|---|
| ● List* | Preservation of data and associated icons |
| ○ Page Header* | Primary action and navigation — 702 |
| ○ Keyboard Search | Search within a list |
| ○ Basic Create | Add items to a list. — 704 |
| ○ Inline Actions | Gesture-based shortcut to actions |

* required patterns

Fig. 7A

METHOD AND SYSTEM FOR IMPLEMENTING A PATTERN VIEWER

RELATED APPLICATIONS

The present application claims the benefit of priority to U.S. Provisional Patent Application Ser. No. 61/663,127, entitled "METHOD AND SYSTEM FOR IMPLEMENTING A PATTERN VIEWER", filed on Jun. 22, 2012, and U.S. Provisional Patent Application Ser. No. 61/777,465, entitled "METHOD AND SYSTEM FOR IMPLEMENTING A PATTERN VIEWER", filed on Mar. 12, 2013, which are all hereby incorporated by reference in their entireties.

BACKGROUND AND SUMMARY

The present application relates to software development, and more specifically to systems, methods, and patterns for facilitating and designing software applications.

Software designers and developers are faced with many challenges. For example, consider the numerous challenges faced by developers for mobile computing applications, including challenges due in part to limited screen space for displaying user interfaces and limited computing resources, including memory, processor speeds, and network bandwidth limitations. Limited screen space is a particularly limiting requirement for mobile software applications. Furthermore, mobile computing applications often run on mobile communications devices, such as cellular telephones, which often subject the user to multiple frequent distractions, including distractions from calls, text messages, changes in physical environment, and so on. Mobile enterprise computing applications are particularly demanding, as mobile enterprise application users often must maintain connectivity with multiple computing resources and applications available via a corporate network.

One approach that can be taken to address these issues is to utilize design patterns. U.S. Patent Publication No. 2008/0222561 discloses a generalized faceted browser decision support tool that can be used with design patterns. U.S. Patent Publication No. 2011/0302516 discloses an approach to implement mobile design patterns.

Design patterns libraries are especially useful for users who wish to build mobile applications but are not professional designers. By utilizing design patterns as building blocks, many different kinds of applications may be created. However, in order for a user to be able to effectively make use of a design pattern library, the user must be able to easily understand the functionality of the various patterns and how they relate to one another.

The present disclosure is directed to an improved method, system, and computer program product for utilizing design patterns. In some embodiments, the present application provides an improved approach for organizing, navigating and/or visualizing design patterns. This approach may be embodied as a mobile design pattern viewer.

Further details of aspects, objects, and advantages are described below in the detailed description, drawings, and claims. Both the foregoing general description and the following detailed description are exemplary and explanatory, and are not intended to be limiting as to the scope of the claimed invention.

BRIEF DESCRIPTION OF THE DRAWINGS

FIGS. 6, 7A-D, 8, and 9 illustrate example interfaces showing groupings of patterns within categories.

DETAILED DESCRIPTION

Figure 1:
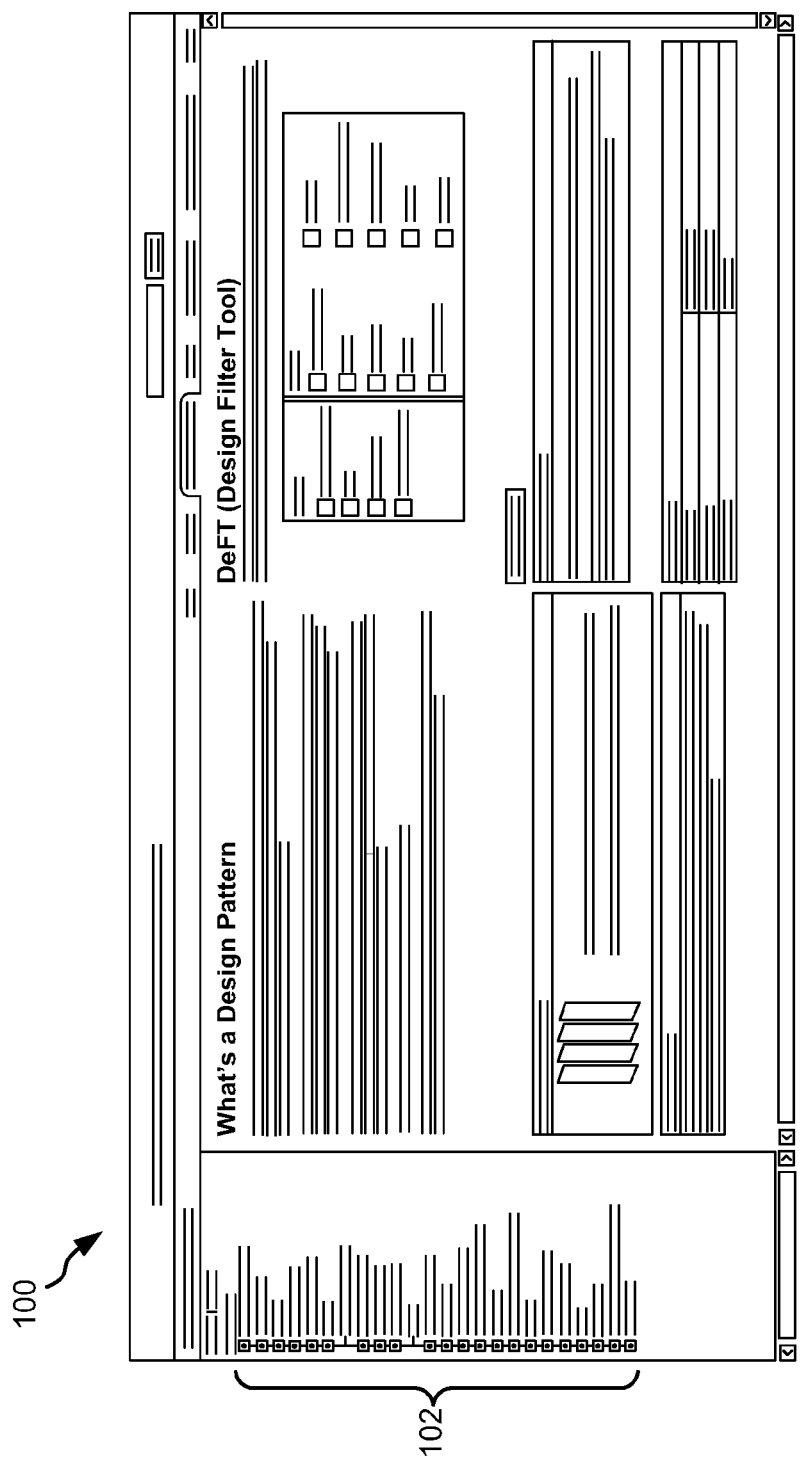
FIG. 1 shows an example interface for viewing design patterns, where the left portion of the interface includes an alphabetical listing of design patterns within an expandable tree.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

The present disclosure is directed to an improved method, system, and computer program product for utilizing design patterns. In some embodiments, the present invention provides an improved approach for organizing, navigating and/or visualizing design patterns. This approach may be embodied as a mobile design pattern viewer.

The current embodiment of the invention is different from prior approaches in that it presents design patterns in logical groupings, allows visualization of individual patterns, and highlights relationships. This permits organization, navigation, and/or visualization of the design patterns, where a collection of patterns work together as an integrated set that enables users to understand how an individual pattern relates to other patterns.

For the purposes of the present discussion, a user interface template may be any pattern or layout used to describe or depict how data and/or functionality is displayed via an application and/or accessed by a user via the application. Patterns provide solutions to common design problems. The terms "pattern" and "template" are employed interchangeably herein. A mobile design pattern may be any pattern or template that is specifically adapted for use with a mobile computing device, such as a wireless phone and/or pocket Personal Computer (PC). Note that a particular component of a design pattern, such as a component defining the layout or organization of data and functionality on a single user interface screen, may also be considered a design pattern, as may a collection of such components that are designed to work together.

The present disclosure illustratively explains embodiments in the context of mobile design patterns. It is noted, however, that the inventive concepts are not limited in their scope only to mobile design patterns, and may be applicable to other types of objects as well, such as patterns for desktop computing environments. Therefore, the embodiments are not to be limited to only mobile design patterns unless explicitly claimed as such.

One approach for navigating through design patterns is to use alphabetical lists. FIG. 1 shows an example of an approach using alphabetical lists, showing an interface 100 where the left portion of the interface includes an alphabetical listing 102 of design patterns. The alphabetical listing 102 may be in the form of an expandable tree. A user may click on entries in the listing 102 to view documentation on the selected design pattern.

However, there are numerous problems with this type of an approach. For example, alphabetical lists often use hard-to-understand names, where identification of patterns relies heavily on the user understanding what the name of the pattern means. Where a pattern should be placed within the expandable tree is also often not obvious, as some patterns may be related to multiple other patterns. The alphabetical lists do not provide information on what patterns go together. Users have to hunt and find each pattern and then must figure out what patterns can be used with the selected pattern.

This makes it so that many users have trouble figuring out where to start when selecting design patterns for their application. For example, an alphabetical list may have an "Add New Element" pattern as the first pattern in a list. However, it is not helpful for many designers to begin designing at such a granular level, as it is important to take into account the larger pattern that the "Add New Element" pattern is a part of (e.g., a list, form, or other high level pattern).

The alphabetical lists do not provide any information or communication of hierarchical relationships between patterns. As noted above, design patterns may occur at many levels, from app-wide navigation, to full and partial screen navigation, and failure to provide this hierarchical information makes the alphabetical lists less user-friendly. For example, different patterns may be alternatives to each other (e.g., an application may use a list pattern with one field per list entry, or a list pattern with two fields per list entry, but not both). In some cases, a pattern may be inside of another pattern. Some patterns may be mandatory for certain applications, while others may be optional (e.g., a list may be required to have a design pattern for list items, and may optionally also have a "search bar" design pattern). Finally, the alphabetical lists do not provide communication of interactions for the patterns. Design patterns sometimes incorporate unique gestures, such as press and hold, to activate interactions that have multiple states, and the alphabetical lists fail to provide this information.

Figure 2:
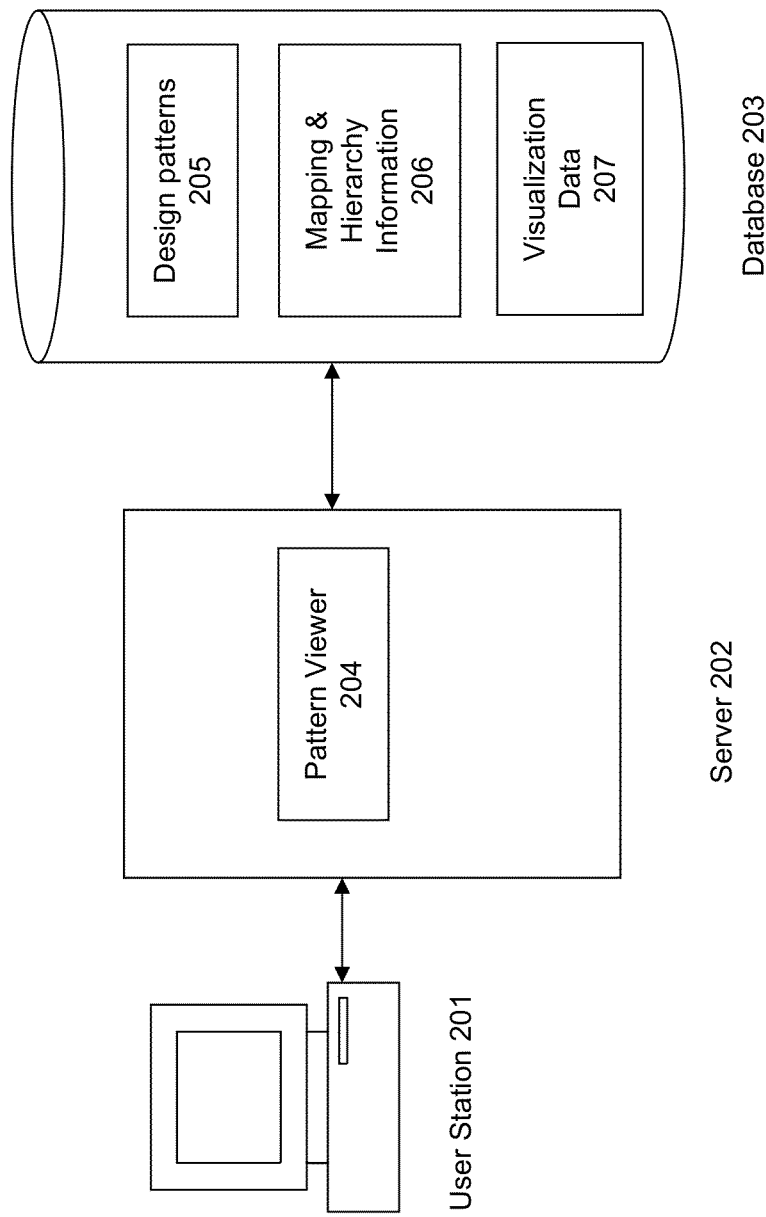
FIG. 2 shows an architecture for a system for implementing a pattern viewer used in some embodiments.

FIG. 2 illustrates an architecture of a system for implementing a mobile design pattern interface used in some embodiments. To view and select design patterns, the user may operate the system at user station 201 to access a pattern viewer application 204 on an application server 202.

Information used by the pattern viewer 204 may be stored in database 203, which includes design pattern data 205, mapping and hierarchy data 206, and visualization data 207. Design pattern data 205 contains the raw data for the individual design patterns in the design pattern library usable for designing an application. Mapping and hierarchy data 206 specifies the relationships and hierarchy of the patterns contained in design pattern data 205. For example, in some embodiments, a pattern may be mandatory in some designs but optional in others. Two or more patterns may be alternatives to each other (e.g., a list pattern having one field per list entry and a list pattern having two fields per list entry may be mutually exclusive). In some designs, patterns may share a parent-child relationship (e.g., in some designs, an "Add New Element" pattern may be a child pattern to "Page Header"). In some embodiments, the mapping and hierarchy information may be specified in the metadata of the individual design patterns. Visualization data 207 may contain graphics or animations illustrating a design pattern. Animations are particularly useful for patterns that comprise gestures. In some embodiments, the visualization data 207 may show how a pattern interacts with other related patterns.

Users at user station 201 may use the pattern viewer 204 to view patterns stored in design patterns 205. The patterns are displayed and organized in accordance with the relationships defined in mapping and hierarchy data 206, and may be displayed with visualization data 207.

The user station 201 comprises any type of computing station that may be used to operate or interface with the application server 202. Examples of such user stations include for example, workstations, personal computers, laptop computers, mobile computing devices, or remote computing terminals. The user station 201 may comprise a display device, such as a display monitor or screen, for displaying interface elements and report data to the user. The user station 201 may also comprise one or more input devices for the user to provide operational control over the activities of the system, such as a mouse, touch screen, keypad, or keyboard. The users of the user station 201 correspond to any individual, organization, or other entity that uses the system to view and select design patterns for an application.

The database 203 corresponds to any type of computer readable mediums or storage devices. The computer readable storage devices comprise any combination of hardware and software that allows for ready access to the data within the database. For example, the computer readable storage device could be implemented as computer memory or disk drives operatively managed by an operating system.

Figure 3:
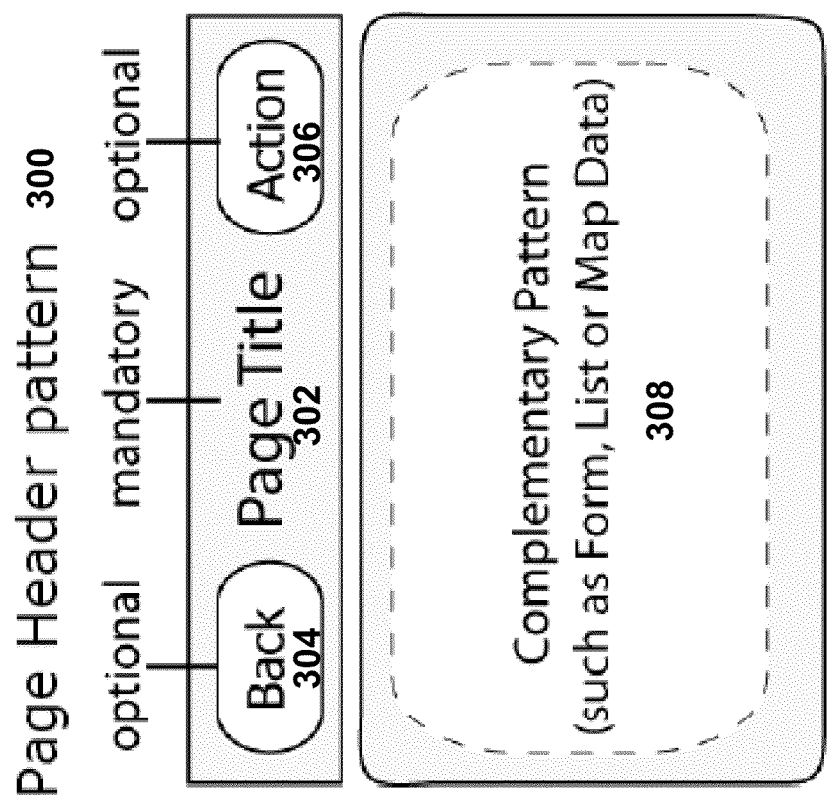
FIG. 3 illustrates an example design pattern having related child and complementary design patterns.

FIG. 3 shows an example pattern illustrating some of the possible relationships between different design patterns. A "Page Header" pattern is a common design pattern that may be used in many mobile designs. In some embodiments, the "Page Header" pattern 300 contains a mandatory child "Page Title" pattern 302. The "Page Header" pattern 300 may also contain one or more optional child patterns, such as "Back" pattern 304 and "Action" pattern 306, which correspond to buttons that may appear on the page header portion of the display, allowing for return to a previous page or the performance of a pre-defined action. The "Page Header" pattern 300 may also have a complimentary relationship with one or more other patterns. For example, "Page Header" pattern 300 may be used to complement a form, list, or map data pattern 308.

Figure 4:
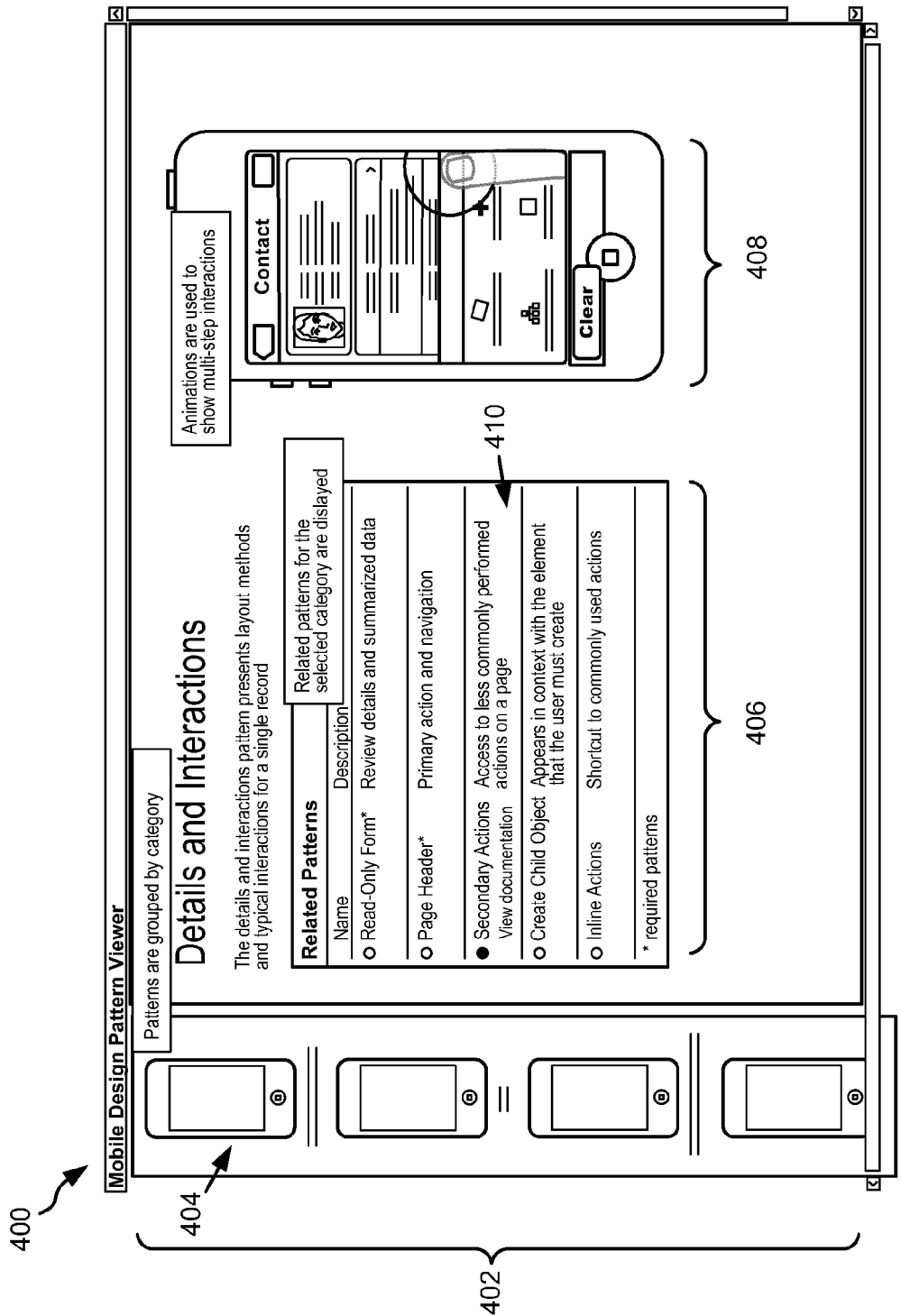
FIG. 4 shows an illustration of an example interface for navigating mobile design patterns according used in some embodiments.

FIG. 4 shows an illustration of an example interface 400 for navigating mobile design patterns used in some embodiments. The interface 400 provides a tool for showing the relationships between different design patterns, and to help a user visualize how design patterns work together. The left side of the interface shows a scrollable list (e.g., icons) 402 of design pattern categories 404. Any suitable set of categories 404 may be used to organize the mobile design patterns. The list of categories would be generally directed to an organizational methodology appropriate for the particular purpose to which the invention is directed. For example, with respect to a pattern viewer for mobile design patterns intended to be used for development of mobile software, example categories may include "entry experience," "list," "details & interaction," and "entering information" categories.

Each category is associated with a logical grouping of individual design patterns, which are displayed in the middle portion of the interface at 406. Any suitable criteria may be used to group patterns together into a given category. For example, the results and analysis from past design projects may be used to identify patterns which are proven to be compatible with each other, and which therefore are grouped together into the same category. This approach could be used to filter out additional patterns that, by their "name or "title," appear to be pertinent to a given category but from past experience known not to be compatible with one or more other patterns already associated with the category.

Hierarchical relationships between the patterns may be shown in the interface. Any type of hierarchical relationship may be displayed for the user using embodiments of the invention. For example, design patterns may exist on many levels, from application-wide navigation, to full screen navigation, to partial screen navigation. Therefore, it is possible that a hierarchically higher level design pattern will wholly encapsulate the details of a lower level design pattern. An example of this is shown in FIG. 7A, in which the "page header" pattern 702 is a hierarchically higher level pattern that includes the details of the lower level "basic create" pattern 704. These hierarchal relationships may be inferred by the user, e.g., using the interface shown in FIG. 7A. Alternatively, the interface can be configured to make these relationships visually explicit, e.g., by providing check boxes or other visual indicators to indicate the inclusion of a lower level pattern within a higher level pattern.

The right side of the interface provides a visual depiction of a pattern (or multiple patterns) 408. A selected pattern 410 (e.g., "Secondary Actions") is displayed in this portion of the interface, providing visualization of the expected end-product from using the pattern. Animation may be used to depict the usage and details of the pattern. Other types of highlighting may also be employed. For example, a representation of a user's finger performing an action associated with the design pattern may be used to illustrate the functionality of the design pattern. In some embodiments, colored lines or other visual cues may be used to identify portions of the display that are pertinent to the pattern, e.g., a colored box around the portion of the display that pertains to the selected pattern.

While FIG. 4 shows a particular ordering and organization of UI elements, it is noted that the UI elements may be organized in different ways without detracting from the scope of the invention. For example, the current embodiment includes a left-to-right ordering of the viewer elements, with the category icons on left, middle portion with related patterns, and images with animations on the right side. In an alternate embodiment, it is possible to shift these elements to different portions of the interface, e.g., to place the images with animations to be in the middle and the related patterns table on the right side.

The present embodiments address many of the shortcomings of the alphabetical list approaches. Because visualizations are provided for the listing of design patterns that potentially includes animations and colored lines, the user is better able to understand the design patterns and how they interact with other patterns. For example, animation can be used to display the unique gestures associated with a pattern, such as press and hold gestures that are used to activate interactions in the pattern. Colored lines may be used to identify portions of the display pertinent to the selected pattern (i.e., a "Page Header" pattern in some embodiments may only be pertinent to the top portions of the display).

Patterns are grouped together into logical categories, where the invention can be configured to show a smaller list of related patterns based on a currently selected pattern. In addition, the present invention can be configured to highlight key relationships between the patterns. For example, selecting the list category will only display design patterns that are related to the list pattern. The displayed patterns may be marked as "required" or "optional," and a visualization or animation may be used to display how a child pattern fits in with a parent pattern.

By displaying the patterns (thereby providing visualization of the patterns), a user can quickly understand much about a design pattern by simply previewing a representative image of the patterns. In addition, static screen shots do not always explain how an interaction works. The benefit of using animations is that multi-state designs can be more easily understood.

By appropriately grouping patterns together instead of using just an alphabetical list, mobile designs can thus be analyzed and mapped out to a grouping of mobile design patterns based on an application user flow. As noted above, one approach is to group patterns by entry experience, then displaying data by lists, details of one record, and editing information.

In addition, pattern relationships can be usefully understood by the user. Once a pattern is selected, related patterns are displayed. Some pattern relationships are hierarchical in that a pattern may contain a pattern, such as creating a new item from within the page header, while others are complementary or even mutually exclusive. These relationships are conveyed visually by showing the pattern in context with related patterns.

Figure 5A:
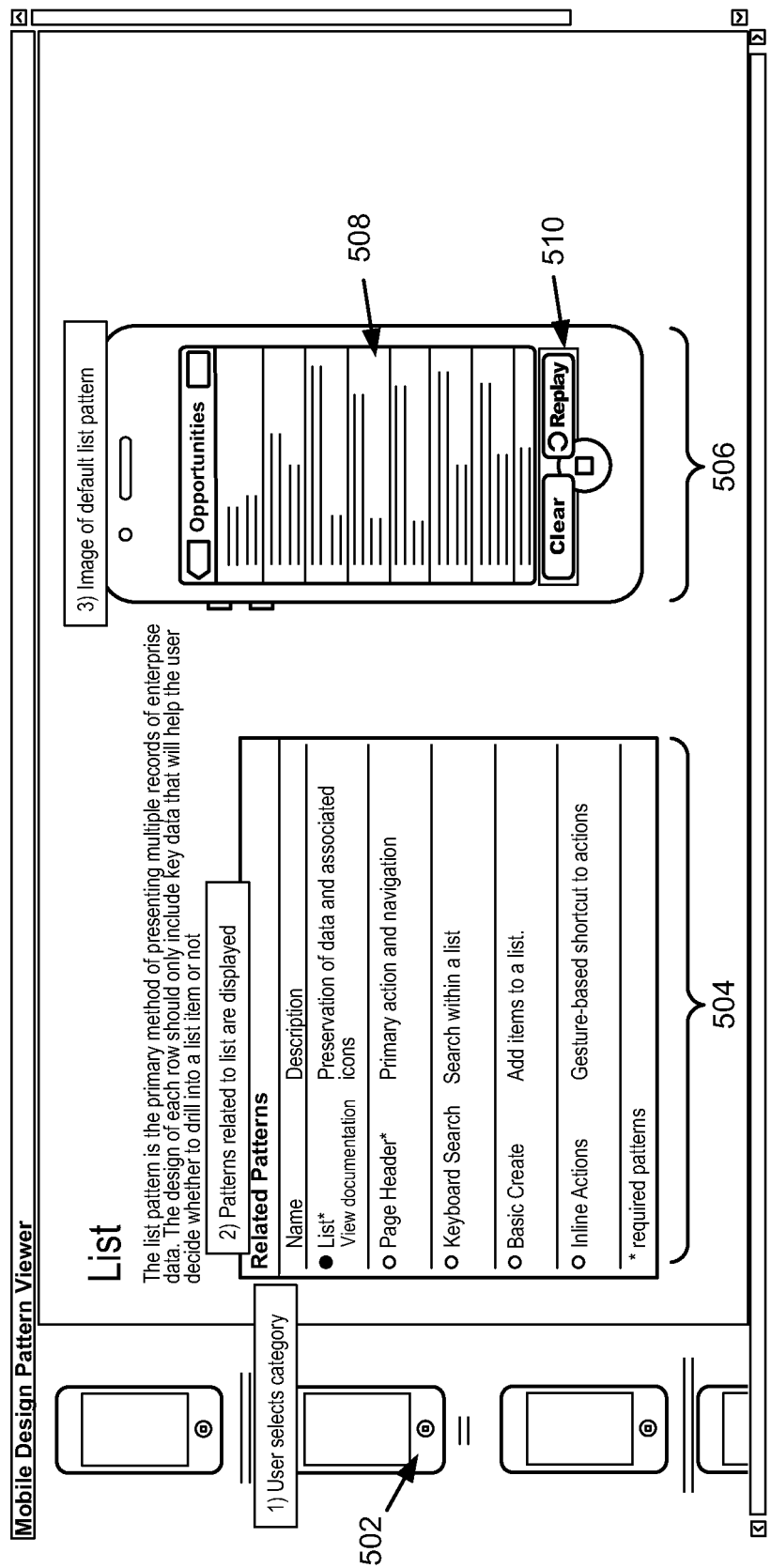
FIGS. 5A-B illustrate the process of how a user can visually preview different mobile design patterns that are grouped by related patterns.
Figure 5B:
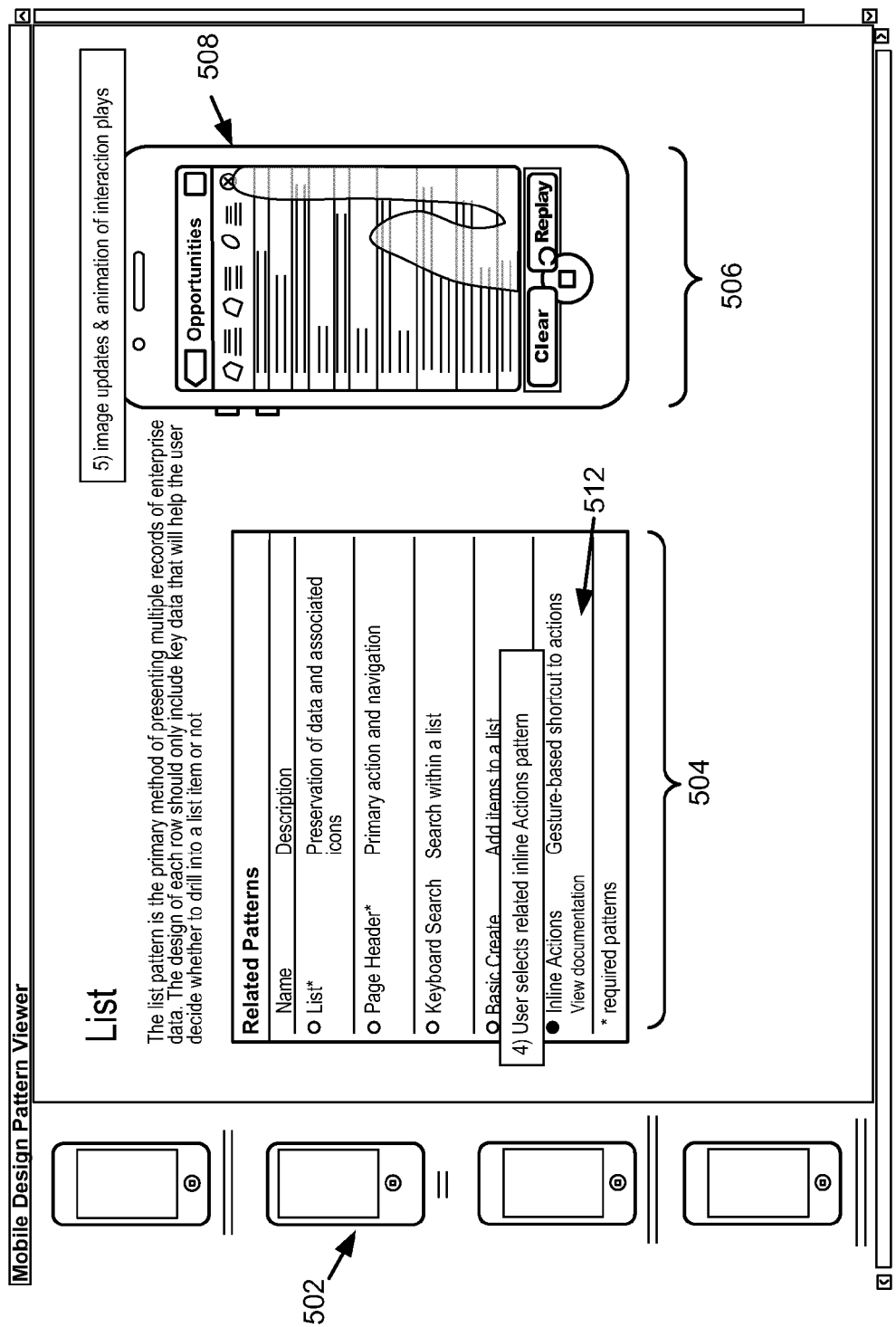

FIGS. 5A-B illustrate the process of how a user can visually preview different mobile design patterns that are grouped by related patterns. At (1), the user selects a category (e.g., the list category 502) from the icons on the left side of the interface. At (2), the patterns pertaining to the selected category are displayed in the middle portion of the interface at 504. Only the patterns related to the "list" category are displayed at 504. Some of the patterns may be marked as required ("list" and "page header"), while the remaining patterns, such as "keyword search," are optional. At (3), the image of the default pattern for the category is displayed on the right portion of the interface at 506. For example, visualization 506 may show a screen with default visualizations of the required patterns ("list" and "page header"), but not any of the optional patterns. Colored lines 508 may be used to highlight the portion of the display that pertains to the selected pattern (the "list" pattern). In some embodiments, one or more buttons 510 may be displayed to allow the user to alter the visualization. For example, in some embodiments a "Clear" button may be used to allow a user to clear optional patterns from the visualization, while a "Replay" button may be displayed for visualizations that comprise animations, and allows the user to replay an animation.

In FIG. 5B, at (4), the user selects a specific pattern (e.g., "Inline Actions" pattern 512) from the list of patterns in the middle portion of the interface. At (5), the image 506 on the right portion of the interface is updated for the selected pattern. For example, an animation for the pattern, including animation of a ghosted image of the user's usage of the pattern, is displayed in the interface. This allows for the user to quickly be able to determine the function of a given design pattern and how it interacts with other design patterns. Colored lines 508 may be used to highlight the portion of the displaying pertaining to the "Inline Services" pattern.

Figure 6:
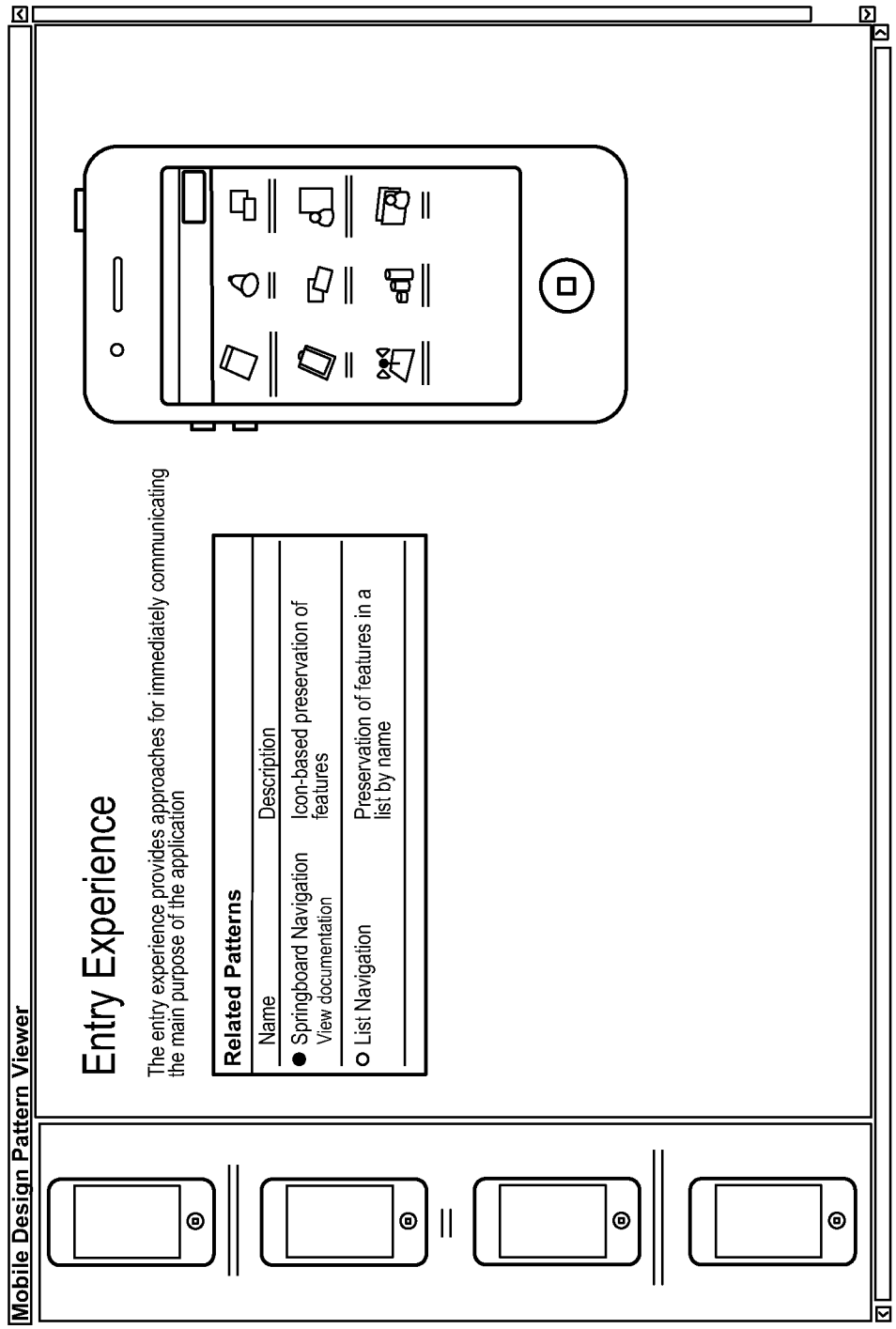

FIGS. 6-9 illustrate example interfaces showing groupings of patterns within categories. FIG. 6 illustrates the patterns that may be grouped within the "Entry Experience" category. Such patterns may include, for example, the "Springboard Navigation" and "List Navigation" patterns. In some embodiments, these two patterns may be alternate required patterns. In such an embodiment, a user using an "Entry Experience" design selects either the "Springboard Navigation" pattern or the "List Navigation" pattern, but cannot select both.

FIG. 7A illustrates the patterns that may be grouped within the "List" category. Such patterns may include, for example, the "List," "Page Header," "Keyword Search," "Basic Create," and "Inline Actions" patterns. In this embodiment, "List" and "Page Header" are required patterns, while "Keyword Search," "Basic Create," and "Inline Actions" are optional.

Figure 7B:
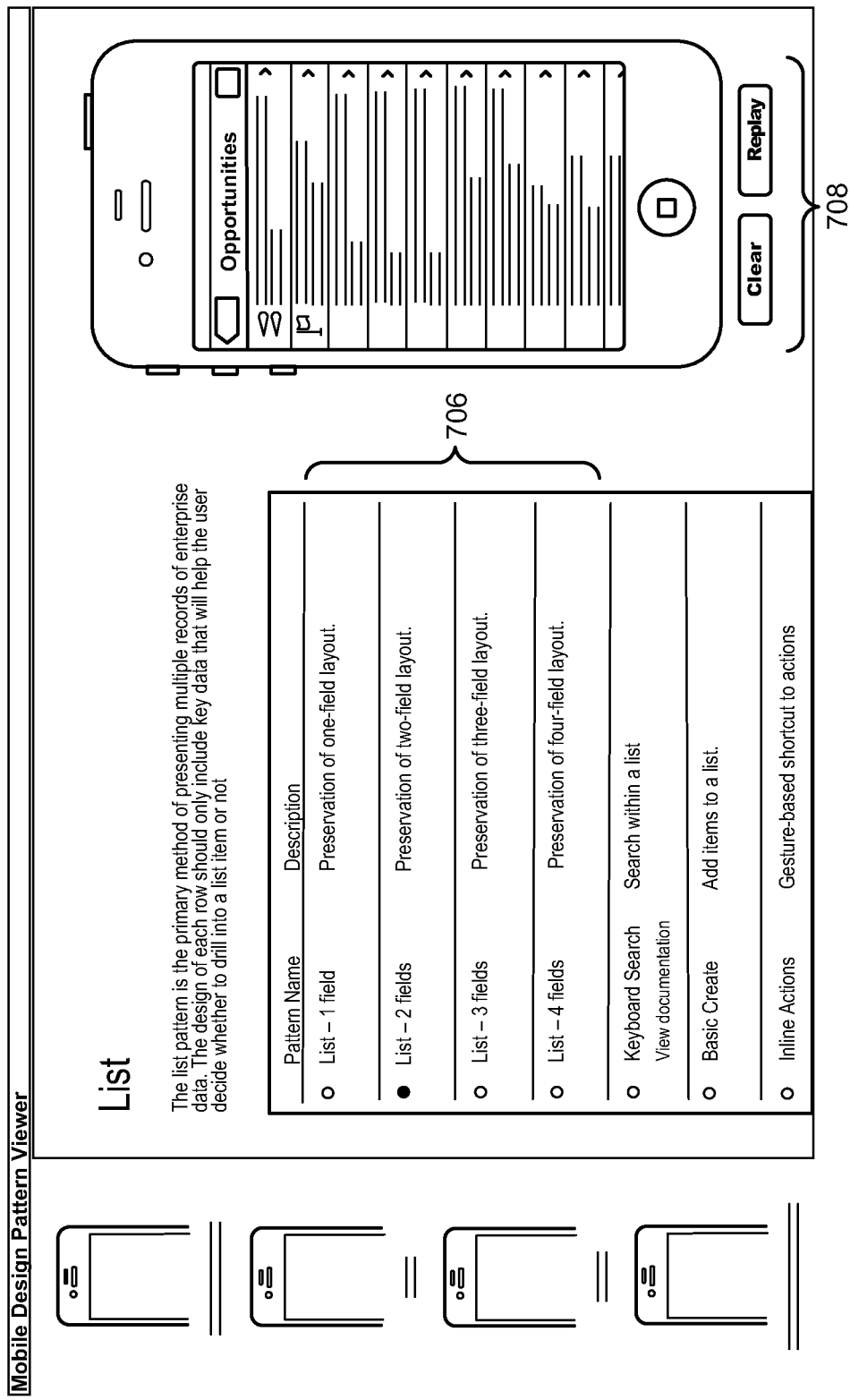

FIG. 7B illustrates patterns that may be grouped within the "List" category in an alternate embodiment. In FIG. 7B, each list entry in a list may have between one and four fields. These may each be represented as different design patterns at 706. For example, visualization 708 shows a list with two fields per list entry (a first field comprising a title in larger bold text and a second field comprising a subtitle in smaller, un-bolded text). The four patterns at 706 are mutually exclusive; only one can be selected at a time. In some embodiments, this relationship may be inferred by the user. Alternatively, the interface can be configured to make these relationships more visually explicit, e.g., by greying out the incompatible patterns when one is selected, or visually marking the patterns to indicate that they are part of a group.

Figure 7C:
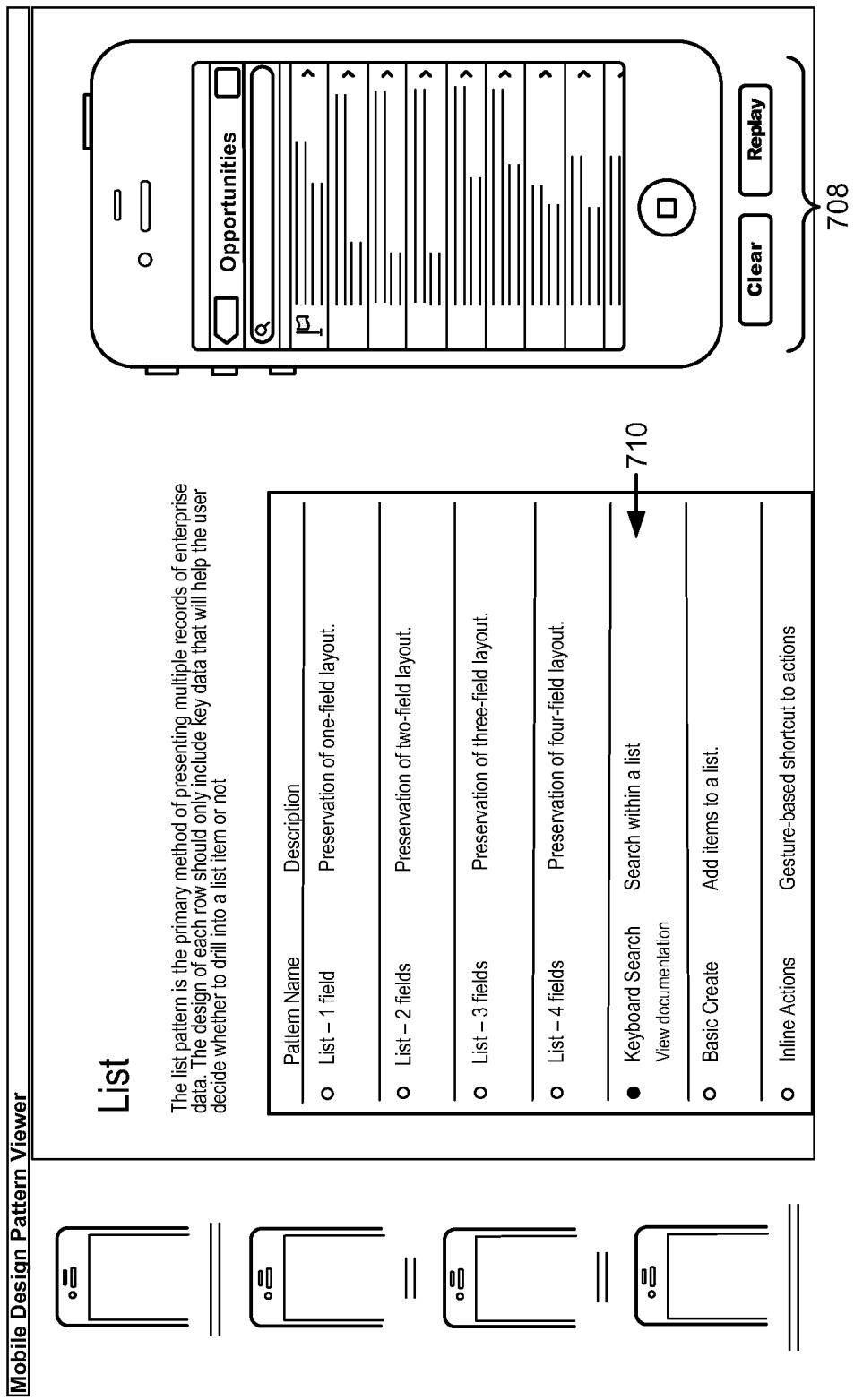

FIG. 7C illustrates selecting a different pattern in the embodiment illustrated in FIG. 7B. In FIG. 7C, the pattern "Keyword Search" 710 has been selected. Visualization 708 is updated to show the "Keyword Search" pattern in context with the other "List" category patterns. For example, the particular embodiment illustrated in FIG. 7C shows the "Keyword Search" pattern between the "Page Header" and the "List—2 Fields" pattern. This allows the user to easily see how a pattern is displayed relative to its related patterns.

Figure 7D:
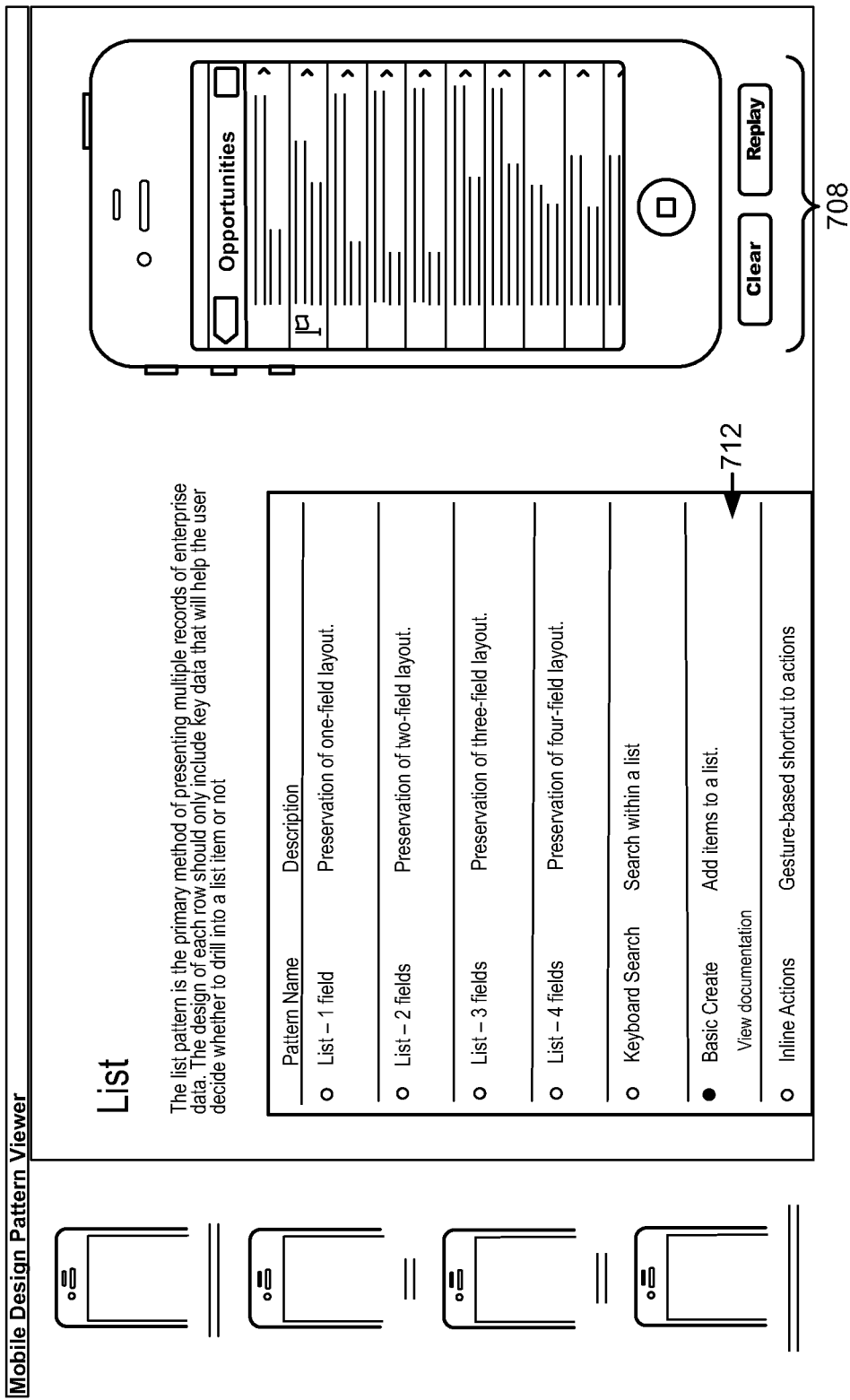

FIG. 7D illustrates selecting a child pattern in the embodiment illustrated in FIG. 7B. In FIG. 7D, the child pattern "Basic Create" 712 has been selected, which in some embodiments may be a child pattern of "Page Header." Visualization 708 is updated to show the "Basic Create" pattern within the "Page Header" pattern. In some embodiments, the "Page Header" pattern may have a visual indicator when the "Basic Create" pattern is selected to indicate the parent-child relationship between the two patterns.

Figure 8:
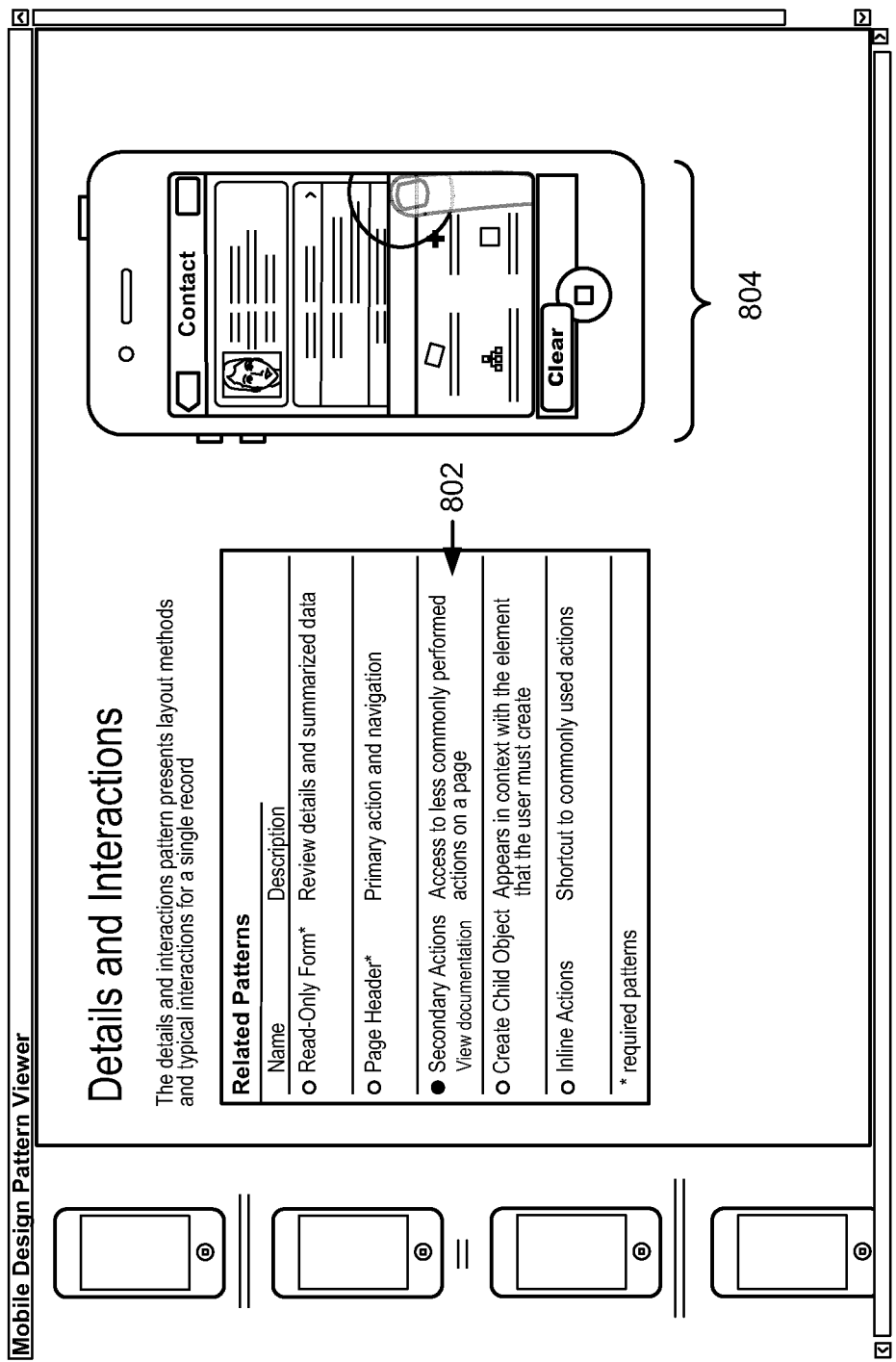

FIG. 8 illustrates the patterns that may be grouped within the "Details and Interactions" category. Such patterns may include, for example, the "Read-Only Form," "Page Header," "Secondary Actions," "Create Child Object," and "Inline Actions" patterns. As illustrated in FIG. 8, "Read-Only Form" and "Page Header" are marked as required patterns, and are shown in visualization 804. The "Secondary Actions" pattern 802 has also been selected, and visualization 804 is updated with an animation showing the functionality of the "Secondary Actions" pattern in conjunction with the required "Read-Only Form" and "Page Header" patterns.

Figure 9:
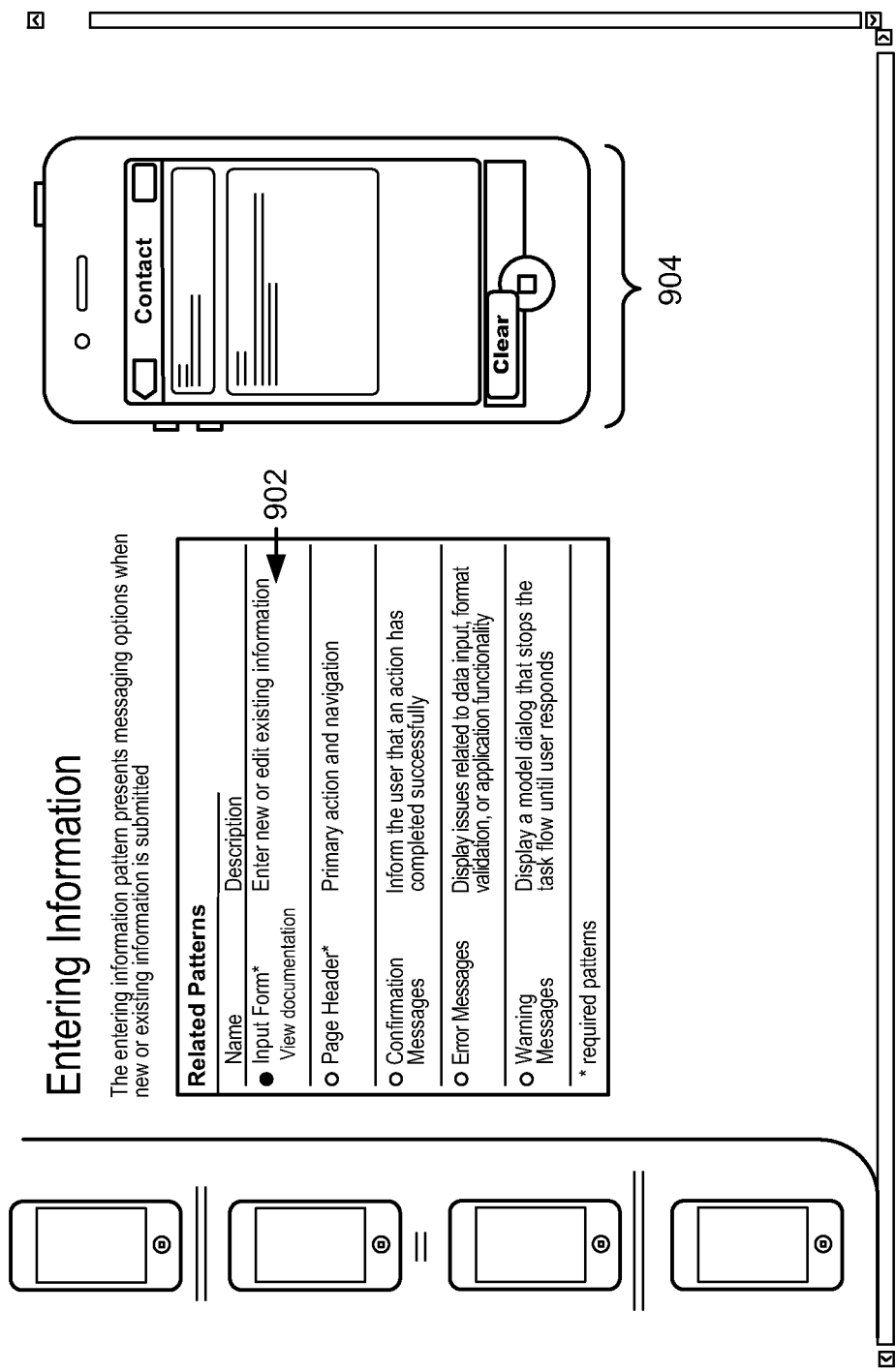

FIG. 9 illustrates the patterns that may be grouped within the "Entering Information" category. Such patterns may include, for example, the "Input Form," "Page Header," "Confirmation Messages," "Error messages," and "Warning Messages" patterns. In the embodiment illustrated in FIG. 9, the "Input Form" is selected at 902, and shown in visualization 904. As both "Input Form" and "Page Header" patterns are required patterns for the "Entering Information" category, and visualization 904 also shows a default example of the "Page Header" pattern.

It can be seen that certain patterns may be placed into multiple categories. For example, the "Page Header" pattern is associated with the "List," "Details and Interactions," and "Entering Information" categories, while the "Inline Actions" pattern may be an optional pattern associated with the "List" and "Details and Interactions" patterns. In some embodiments, it may be possible for a pattern to be a required pattern in some categories, but an optional pattern in other categories.

Figure 10:
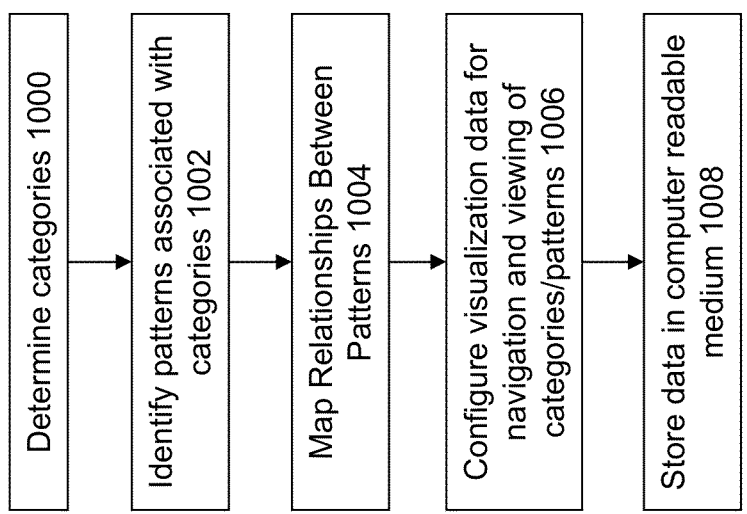
FIG. 10 shows a flowchart of an approach for implementing a design pattern interface used in some embodiments.

FIG. 10 shows a flowchart of an approach for implementing a pattern interface used in some embodiments. At 1000, a determination is made of the different categories to be displayed for the interface. As noted above, any suitable set of categories may be used to organize the mobile design patterns. The specific set of categories to be implemented would depend upon the particular purpose to which the invention is directed. For example, with respect to a pattern viewer for mobile design patterns intended to be used for development of mobile software, example categories may include "entry experience," "list," "details & interaction," and "entering information" categories.

At 1002, identification is made of the patterns that are to be associated with each category. Any suitable criteria may be used to group patterns together into a given category. In one embodiment, analysis from past design projects may be used to identify patterns that are compatible with each other, and which are therefore grouped together into the same category. This approach could be used to filter out additional patterns that are not compatible with each other. In addition, a pattern may be associated with multiple categories.

At 1004, relationships between patterns may be mapped. Patterns are not only part of one or more categories, but may also have different relationships with other patterns. Possible relationships between patterns may include: contains, alternative, complementary. For example, a "Page Header" pattern in the "List" category may contain an "Add New Entry" pattern, and may be complementary to a "List" pattern. Patterns such as "List—one field" and "List—two fields" may be alternative patterns.

Figure 11:
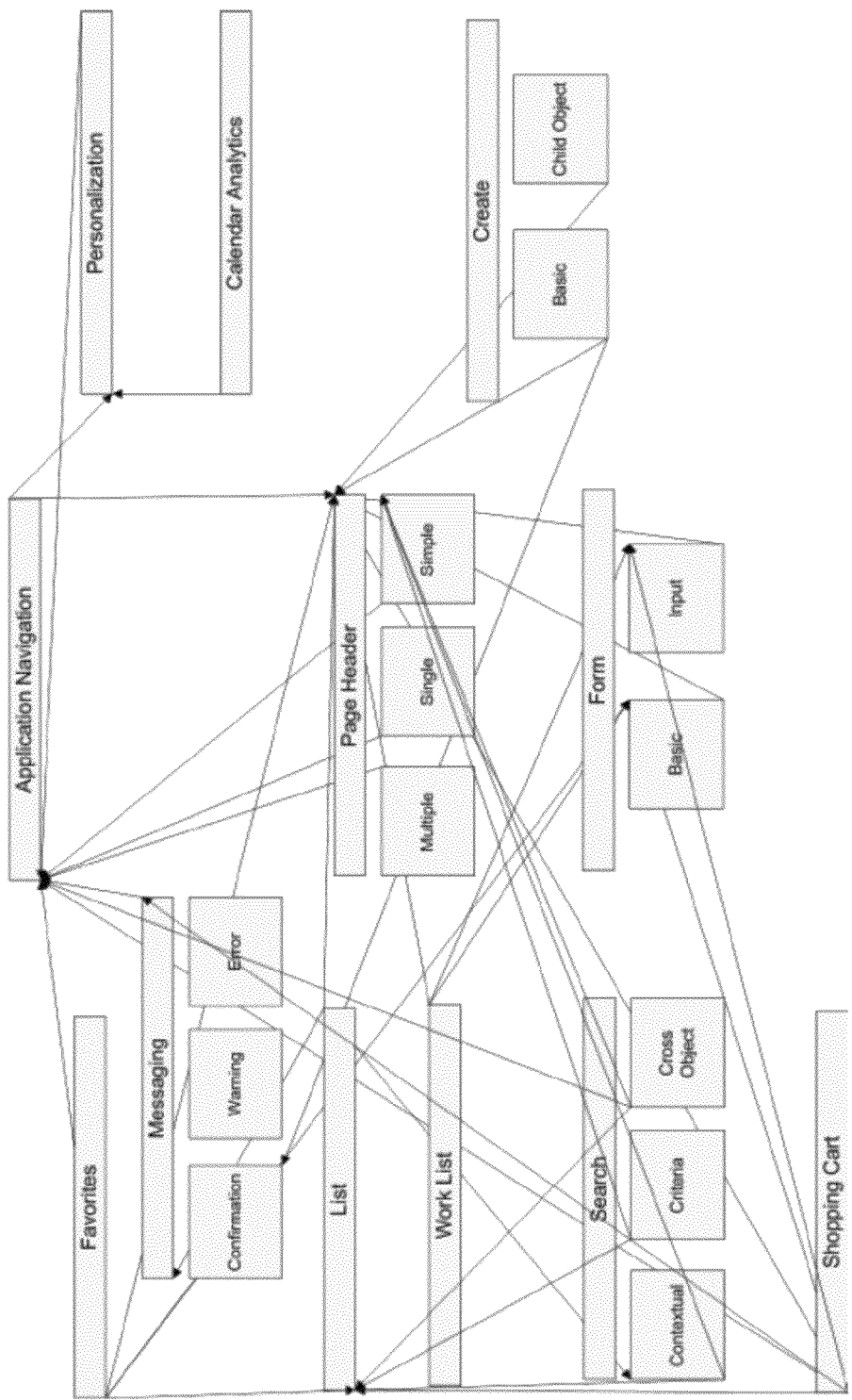
FIG. 11 shows an example mapping of relationships between design patterns.

FIG. 11 illustrates a mapping of pattern relationships that may be defined in some embodiments. As can be seen in FIG. 11, patterns may be related to multiple other patterns (e.g., "Page Header" is related to "List," "Application Navigation," and "Favorites"). The mappings may also reflect parent-child relationships between patterns. For example, "contextual search" may be a child pattern of "page header," which may be in turn a child pattern of "list."

In some embodiments, the identifying of categories and mapping of relationships for design patterns may be done by modifying the metadata of the design patterns. For example, the metadata for pattern A may indicate that pattern A is a required pattern for the "list" category and an optional pattern in the "entering information" category. The metadata may also show that pattern A is an alternate pattern to pattern B in the "list" category. Other possible relationships expressed in pattern metadata may include "contains" and "complementary."

At 1006, visualization data is configured for the patterns. Animation may be identified or associated with a pattern. Highlighting mechanisms may also be employed for the patterns, e.g., using colored lines or other visual cues to identify portions of the display that are pertinent to the pattern. For example, a colored box may be drawn around the portion of the display that pertains to the selected pattern. In some embodiments, multiple images or animations may be configured for patterns that are related to multiple other patterns. For example, a "page header" pattern may be related to a "list" pattern and a "form" pattern. Different visualizations may be used to display how the "page header" pattern is used with each of the other patterns.

At 1008, the data associated with the interface is stored into a computer readable medium. This data is accessed when the user uses the mobile design pattern viewer to navigate through the set of available patterns.

Figure 12:
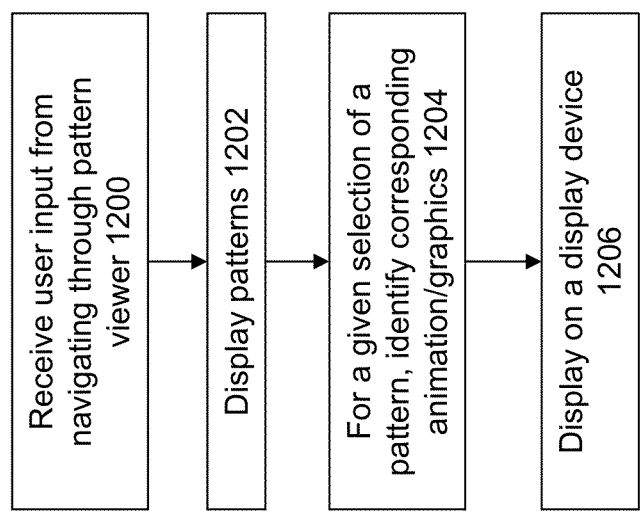
FIG. 12 shows a flowchart of an approach for allowing a user to use the mobile design pattern viewer according to some embodiments.

FIG. 12 shows a flowchart of an approach for allowing a user to use the mobile design pattern viewer according to some embodiments. It is assumed that the interface is being displayed to the user (e.g., on a display device such as a computer monitor or other electronic display device) and the user has access to a suitable input device (e.g., mouse, keyboard, or touchscreen) to provide input signals to the interface.

At 1200, user inputs are received from the user navigating through the interface. For example, the user may provide inputs to select a category from the list of categories on the interface (e.g., by using the input device to select an icon associated with a desired category).

Next, at 1202, the patterns/pattern hierarchy for the selected category are displayed to the user, e.g., on a computer monitor. The patterns displayed in the interface may include a selectable listing of some or all the patterns associated with the category. In some embodiments, visual indicators may be used to indicate hierarchical relationships between different patterns. For example, required patterns may be marked with an *. Different colors or other indictors in the selection fields of patterns, or the placement positions of patterns (e.g., a child pattern may be indented relative to a parent pattern), may be used to indicate parent-child, complementary, or alternate relationships between patterns.

At 1204, identification is made of the visual data to be displayed for a given pattern to be displayed. The visual data may include, for example, animation, graphics, or colored highlighting. The visual data may be based on just the selected pattern, but may also be based on the current category and/or other patterns selected by the user.

At 1206, the visual data for the pattern is displayed to the user, e.g., on a display device. The specific pattern to be viewed may be a default pattern (if the user has just selected a category), or a specific pattern (if the user has already made a selection of a pattern of interest). In some embodiments, the hierarchy of displayed patterns for the category may also be updated. For example, if the user selected a pattern A wherein pattern A is an alternate of pattern B, then the selection area for pattern B may become greyed out, indicating to the user that it can no longer be selected.

Figure 13:
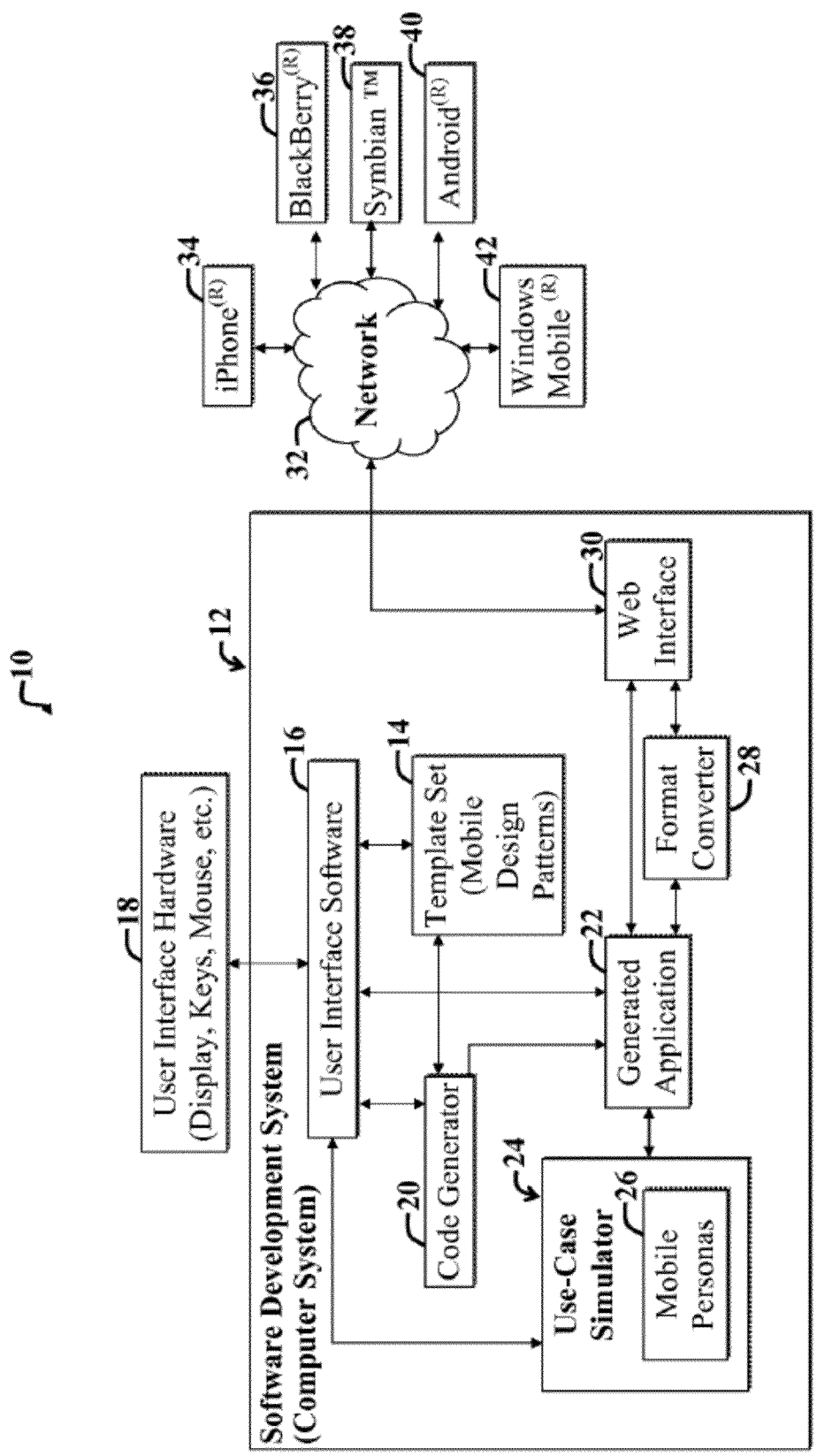
FIG. 13 is a diagram illustrating an example software development environment for employing one or more mobile design patterns to construct applications for mobile computing devices.

FIG. 13 is a diagram illustrating an example software development environment 10 for employing one or more mobile design patterns 14 to construct applications 12 for mobile computing devices 34-42. The environment 10 includes a software development system 12 running user interface software 16. User interface display screens produced by the user interface software 16 are accessible to users via user interface hardware 18, which may include a display, keys, mouse, and so on.

The software development system 12, which may run on a computer system, such as a Personal Computer (PC), further includes a code generator 20 in communication with the user interface software 16. A set of mobile design patterns 14, also called templates, are accessible to the user interface software 16 and the code generator 20. The code generator 20 includes machine-readable instructions for selectively incorporating mobile design patterns from the template set 14 into a generated software application 22 in response to user input via the user interface software 16, as discussed more fully below. A generated software application 22 is accessible to the user interface software 16. A user may employ the user interface hardware 18 and the user interface software 16 to both provide input to the code generator specifying details of a software application to be generated with reference to the template set 14 and to test features of the generated application 22.

For illustrative purposes, an optional use-case simulator 24 is shown in communication with the generated application 22 and the user interface software 16. The use-case simulator 24 includes descriptions corresponding to different mobile personas 26. In the present example embodiment, the use case simulator 24 includes machine-readable instructions, i.e., computer code, for testing the generated application 22 in accordance with predetermined criteria corresponding to different mobile personas 26 and to provide feedback in response thereto to the user interface software 16. The feedback may be analyzed by a user to facilitate making adjustments to the generated application 22 via the code generator 20 and the user interface software 16. Exact details of the use-case simulator 24 are application specific. The feedback provided from the user-case simulator 24 to the user interface software 16 may include ratings organized in accordance with predetermined criteria associated with each of the mobile personas 26.

The software development system 12 further includes a web interface 30 for making the generated application 22 available to mobile computing devices 34-42 via a network 32, such as the Internet. The generated application 22 may be made available as a web service or other browser-accessible application. The application 22 may be accessible via one or more browsers running on the mobile computing devices 34-42. For the purposes of the present discussion, a web service may be any functionality, such as represented by a program, function, process, or other functionality that is accessible or otherwise may be activated via a message sent over a network. An example message includes a Uniform Resource Locator (URL) sent over a network via HyperText Transfer Protocol (HTTP). Another example message includes an eXtensible Markup Language (XML) message sent in accordance with Simple Object Access Protocol (SOAP). Web services may be written in various languages, such as Web Services Description Language (WSDL), JAVA, and so on.

Alternatively, the generated application 22 may be made available for download to the mobile computing devices 34-42 (also called mobile devices) or for upload to another server. When a generated application is to be run client-side, i.e., as a native application running on one or more of the mobile devices 34-42, the code generator 20 may make certain adjustments to the application 22 so that the application can run as an executable or as a plug-in on the mobile devices 34-42.

For illustrative purposes, the mobile devices 34-42 are shown including an iPhone™ 34, a BlackBerry™ 36, a Symbian™ 38, an Android™ 40, and a Windows Mobile™ 42 device. Note that applicable mobile computing devices 34-42 are not limited to those shown in FIG. 12. Other examples of applicable mobile computing devices include tablets, such as the iPad, and other mobile computers, such as an OQO. In general, use of the novel template set 14 facilitates generation of applications that are readily usable and that work efficiently on all of the different mobile devices 34-42, as discussed more fully below.

In certain implementations, it may be desirable to selectively format the generated application 22 for use by each of the different types of devices 34-42. In this case, a format converter 28 may be employed to selectively adjust the format of the generated application 22 in accordance with the type of device 34-42 that is requesting use of the application 22. The mobile devices 34-42 may access the generated application 22, such as for download or use as a browser-based application, via the web interface 30.

Further details regarding an exemplary system for implementing mobile design patterns is disclosed in U.S. Patent Publication No. 2011/0302516, which is hereby incorporated by reference in its entirety.

Therefore, what has been described is an improved method, system, and computer program product for utilizing design patterns. In some embodiments, the present invention provides an improved approach for organizing, navigating and/or visualizing design patterns. This approach may be embodied as a mobile design pattern viewer. The current embodiment presents design patterns in logical groupings, allows visualization of individual patterns, and highlights relationships. This permits organization, navigation, and/or visualization of the design patterns, where a collection of patterns work together as an integrated set that enables users to understand how an individual pattern relates to other patterns.

System Architecture Overview

Figure 14:
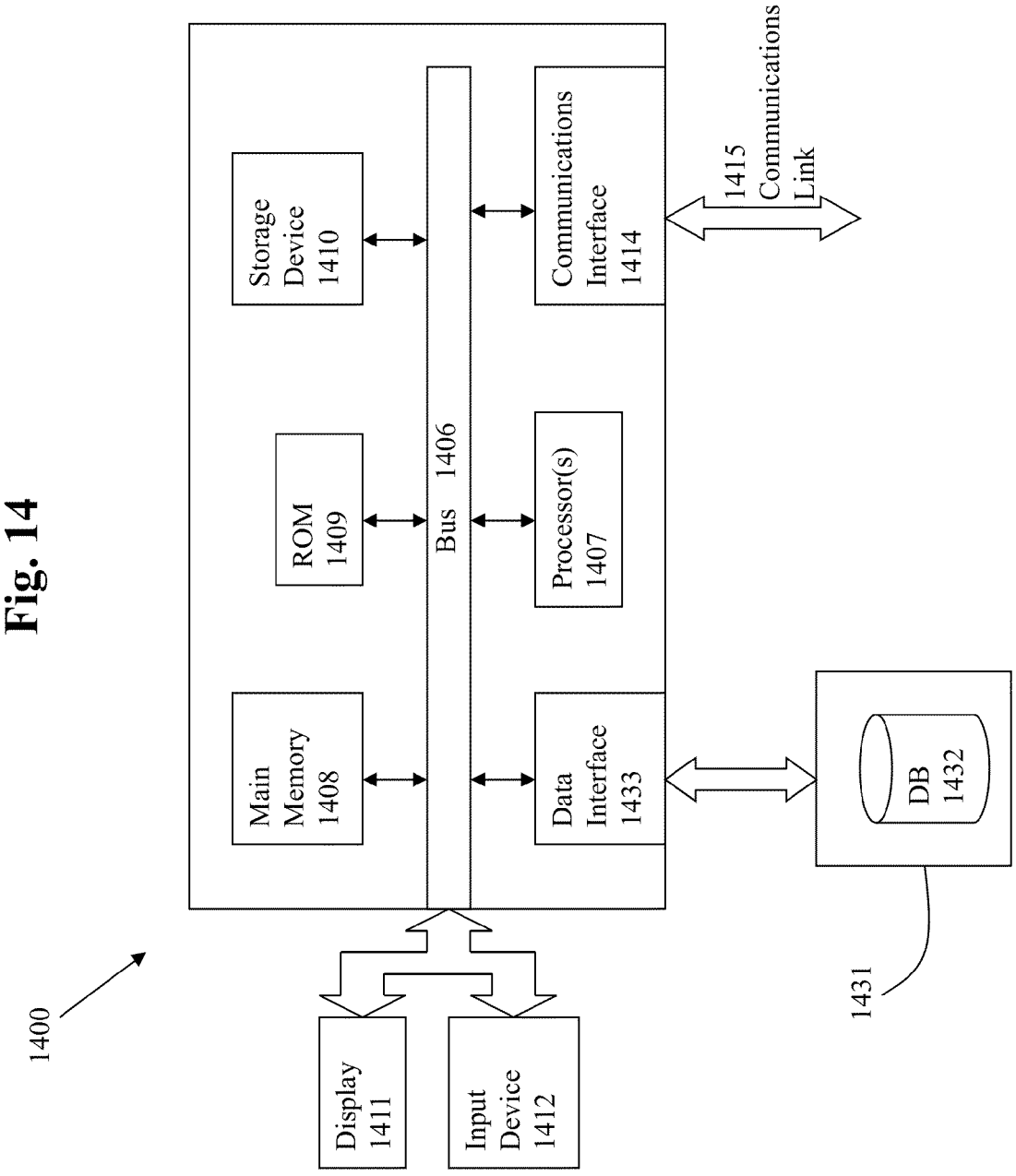
FIG. 14 depicts a computerized system on which an embodiment of the invention can be implemented.

FIG. 14 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be stored in a database 1432 on a storage medium 1431 which is accessed through data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method implemented with a processor, comprising:

configuring a display visualization for a user to view, navigate, and select design patterns;

determining design pattern categories for a mobile device by identifying logical groupings of the design patterns according to user interface compatibility between the design patterns;

displaying a list of representative image icons representing a list of the design pattern categories, wherein each of the representative image icons is configured to visually convey one or more user interface features displayed on the mobile device which are common to a respective set of the design patterns associated with a respective design pattern category;

in response to a selection of a particular design pattern category from the list of the design pattern categories, presenting a set of related design patterns associated with the particular design pattern category selected;

in response to a selection of a related design pattern, rendering a visualization depicting the related design pattern selected displayed on the mobile device; and rendering the display visualization as an integrated view of the list of representative image icons, the related design patterns, and the visualization depicting the related design pattern selected, wherein the integrated view is configured to highlight relationships and differences between the design pattern categories, the related design patterns, and the visualization depicting the related design pattern selected.

2. The method of claim 1, in which animations or colored lines are used to visualize the design patterns.

3. The method of claim 1, wherein determining the compatibility of the design patterns comprises filtering the design patterns according to historical compatibility data.

4. The method of claim 3, in which the design pattern categories include at least one of: "entry experience," "list," "details & interaction," and "entering information" categories.

5. The method of claim 1, wherein the set of related design patterns are displayed and organized in accordance with relationships defined by mapping and hierarchy data.

6. The method of claim 1, in which the design patterns are mobile designs.

7. The method of claim 1, wherein the list of representative image icons comprises a scrollable list of the representative image icons.

8. The method of claim 1, in which the relationships comprise hierarchical relationships.

9. The method of claim 1, wherein when the related design pattern selected includes a child design pattern, providing an option to modify the visualization to convey an interaction between the related design pattern selected and the child design pattern.

10. The method of claim 1, in which a context is provided for the design patterns using pattern visualizations.

11. A non-transitory computer readable medium having stored thereon a sequence of instructions which, when executed by a processor causes the processor to execute a method comprising:
  configuring a display visualization for a user to view, navigate, and select design patterns;
  determining design pattern categories for a mobile device by identifying logical groupings of the design patterns according to user interface compatibility between the design patterns;
  displaying a list of representative image icons representing a list of the design pattern categories, wherein each of the representative image icons is configured to visually convey one or more user interface features displayed on the mobile device which are common to a respective set of the design patterns associated with a respective design pattern category;
  in response to a selection of a particular design pattern category from the list of the design pattern categories, presenting a set of related design patterns associated with the particular design pattern category selected;
  in response to a selection of a related design pattern, rendering a visualization depicting the related design pattern selected displayed on the mobile device; and
  rendering the display visualization as an integrated view of the list of representative image icons, the related design patterns, and the visualization depicting the related design pattern selected, wherein the integrated view is configured to highlight relationships and differences between the design pattern categories, the related design patterns, and the visualization depicting the related design pattern selected.

12. The computer readable medium of claim 11, in which animations or colored lines are used to visualize the design patterns.

13. The computer readable medium of claim 11, wherein determining the compatibility of the design patterns comprises filtering the design patterns according to historical compatibility data.

14. The computer readable medium of claim 13, in which the design pattern categories include at least one of: "entry experience," "list," "details & interaction," and "entering information" categories.

15. The computer readable medium of claim 11, wherein the set of related design patterns are displayed and organized in accordance with relationships defined by mapping and hierarchy data.

16. The computer readable medium of claim 11, in which the design patterns are mobile designs.

17. The computer readable medium of claim 11, wherein the list of representative image icons comprises a scrollable list of the representative image icons.

18. The computer readable medium of claim 11, in which the relationships comprise hierarchical relationships.

19. The computer readable medium of claim 11, wherein when the related design pattern selected includes a child design pattern, providing an option to modify the visualization to convey an interaction between the related design pattern selected and the child design pattern.

20. The computer readable medium of claim 11, in which a context is provided for the design patterns using pattern visualizations.

21. A system, comprising:
  a processor;
  a memory comprising computer code executed using the processor, in which the computer code implements:
  configuring a display visualization for a user to view, navigate, and select design patterns;
  determining design pattern categories for a mobile device by identifying logical groupings of the design patterns according to user interface compatibility between the design patterns;
  displaying a list of representative image icons representing a list of the design pattern categories, wherein each of the representative image icons is configured to visually convey one or more user interface features displayed on the mobile device which are common to a respective set of the design patterns associated with a respective design pattern category;
  in response to a selection a particular design pattern category from the list of the design pattern categories, presenting a set of related design patterns associated with the at least one design pattern category selected;
  in response to a selection of a related design pattern, rendering a visualization depicting the related design pattern selected displayed on the mobile device; and
  rendering the display visualization as an integrated view of the list of representative image icons, the related design patterns, and the visualization depicting the related design pattern selected, wherein the integrated view is configured to highlight relationships and differences between the design pattern categories, the related design patterns, and the visualization depicting the related design pattern selected.

22. The system of claim 21, in which animations or colored lines are used to visualize the design patterns.

23. The system of claim 21, wherein determining the compatibility of the design patterns comprises filtering the design patterns according to historical compatibility data.

24. The system of claim 23, in which the design pattern categories include at least one of: "entry experience," "list," "details & interaction," and "entering information" categories.

25. The system of claim 21, wherein the set of related design patterns are displayed and organized in accordance with relationships defined by mapping and hierarchy data.

26. The system of claim 21, in which the design patterns are mobile designs.

27. The system of claim 21, wherein the list of representative image icons comprises a scrollable list of the representative image icons.

28. The system of claim 21, in which the relationships comprise hierarchical relationships.

29. The system of claim 21, wherein when the related design pattern selected includes a child design pattern, providing an option to modify the visualization to convey an interaction between the related design pattern selected and the child design pattern.

30. The system of claim 21, in which a context is provided for the design patterns using pattern visualizations.

* * * * *